United States Patent [19]

Wroblewski

[11] Patent Number: 4,693,287
[45] Date of Patent: Sep. 15, 1987

[54] BUNDLE LIMBER

[76] Inventor: Franz Wroblewski, Granitvägen 8, S-82600 Söderhamn, Sweden

[21] Appl. No.: 887,807
[22] PCT Filed: Nov. 5, 1985
[86] PCT No.: PCT/SE85/00432
  § 371 Date: Jul. 15, 1986
  § 102(e) Date: Jul. 15, 1986
[87] PCT Pub. No.: WO86/02874
  PCT Pub. Date: May 22, 1986

[30] Foreign Application Priority Data

Nov. 16, 1984 [SE] Sweden .................. 8405744

[51] Int. Cl.⁴ .................. A01G 23/02; B27L 1/00
[52] U.S. Cl. .................. 144/2 Z; 144/208 E; 144/343
[58] Field of Search ........ 144/2 Z, 208 R, 208 E, 144/343, 340, 341

[56] References Cited

U.S. PATENT DOCUMENTS

| | | |
|---|---|---|
| 3,385,331 | 5/1968 | Bronemo et al. .......... 144/2 Z |
| 3,690,352 | 9/1972 | Herdf .......... 144/2 Z |
| 3,789,893 | 2/1974 | Carson et al. .......... 144/208 E |
| 3,913,644 | 10/1975 | Braun . |
| 4,180,109 | 12/1979 | Heikkinen . |
| 4,303,111 | 12/1981 | Neville .......... 144/208 E |
| 4,445,558 | 5/1984 | Banner et al. .......... 144/2 Z |
| 4,574,854 | 3/1986 | Lindblom et al. .......... 144/2 Z |
| 4,596,280 | 6/1986 | Svensson et al. .......... 144/2 Z |

FOREIGN PATENT DOCUMENTS

A2520939 4/1976 Fed. Rep. of Germany .
B430483 11/1983 Sweden .

OTHER PUBLICATIONS

Derwent's Abstract D 5770 C /16, SU 679 390.
Derwent's Abstract C 8002 B /13, SU 605 713.

Primary Examiner—W. D. Bray
Attorney, Agent, or Firm—Larson & Taylor

[57] ABSTRACT

A delimbing device which includes a rotatably mounted drum (13) within which a number of processing devices are mounted for mechanically processing a bundle of stems with twigs in order to limb and preferably also feed said stems longitudinally through the drum. Each processing device consists of at least one rotating member (16, 17) mounted on the inner side of the drum and accompanying the drum rotation. This rotating member comprises one or more tearing, cutting and/or shearing tools, for example screws (16, 17) adapted to remove limbs by cutting.

10 Claims, 4 Drawing Figures

BUNDLE LIMBER

The present invention relates to a bundle limber of the type comprising a rotatably mounted drum within which a number of processing devices are mounted for mechanically processing a bundle of stems or stem portions with twigs in order to limb and preferably also feed said stems or stem portions longitudinally through the drum.

PRIOR ART

In prior art bundle limbers of the above described type, the drum comprises a plurality of individual sections or cylinders between which there are annular gaps through which those twigs can be discharged which are removed from the stems as the stems are fed through the drum and processed, on the one hand in that the stems are tumbled therein and thus process each other and, on the other hand, by the action of the processing devices within the drum. Up to now, these processing devices have consisted of projecting cutters or ridges which are fixedly mounted on the inside of the drum and inclined relatively to the longitudinal axis of the drum and which serve to remove the twigs they come into contact with and also to provide for the necessary longitudinal feeding of the stems through the drum. In order to provide as good a processing effect as possible, the drum has, in actual practice, been given a length of about 20 m. This has implied, however, that the vehicle on which the drum is mounted, has become extremely cumbersome and cannot be used on forest roads near the cutting place, but must be stationed more or less centrally in the cutting area. This in turn has entailed considerable mileage and heavy expense for conveying the trees from the cutting place to the centrally stationed bundle limber. A further pronounced disadvantage of the known limber is the exceedingly mediocre limbing effect of its processing cutters which, in spite of the great length of the drum, are unable to produce completely limbed stem portions.

BRIEF DESCRIPTION OF THE INVENTIVE IDEA

The present invention aims at eliminating the above-mentioned drawbacks of prior art bundle limbers of the type mentioned by way of introduction, and at providing a bundle limber which, though not very long, radically increases the limbing effect. According to the invention, this is achieved primarily in that each processing device consists of or comprises a member mounted on the inner side of the drum and rotatable relatively thereto, said member comprising one or more tearing, cutting and/or shearing tools adapted to remove, during rotation relative to the drum, the twigs from the stem portions by tearing, cutting and shearing, respectively.

BRIEF DESCRIPTION OF THE ENCLOSED DRAWINGS

In the drawings,

FIG. 1 is a schematic perspective view illustrating the inventive bundle limber in operation;

FIG. 2 a schematic, partly cut perspective view showing a section of the drum included in the bundle limber;

FIG. 3 a partly cut end view through the drum section in FIG. 2; and

FIG. 4 a longitudinal view of an alternative embodiment of the invention.

DETAILED DESCRIPTION OF A PREFERRED EMBODIMENT OF THE INVENTION

Figure 1:
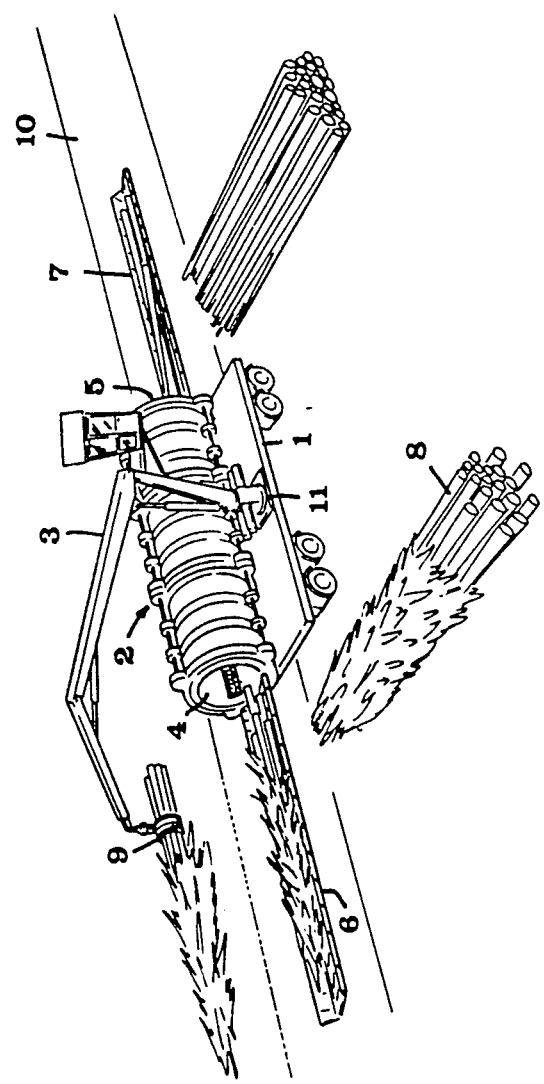

In FIG. 1, 1 designates a wheel-mounted chassis which supports, on the one hand, a limbing drum generally designated 2 and designed in accordance with the principle of the invention and, on the other hand, a crane 3. The drum 2 is open at its two opposite ends while forming an infeed opening 4 and a discharge opening 5 connected with an infeed conveyor 6 and a discharge conveyor 7, respectively, in the form of, for example, endless belts. At 8, a number of stems or stem portions with twigs are shown. By means of grapples 9 on the crane 3, the stems or stem portions are conveyed in bundles from the landing to the infeed conveyor 6, whereupon a bundle of stems of any required size can be longitudinally fed through the drum 2 for limbing. Finally, the limbed stem portions received on the discharge conveyor or table 7 can be removed and stacked by the side of the road 10. As clearly shown in FIG. 1, the drum 2 is disposed beside the centre of the chassis 1 so that the chassis may accommodate the crane 3, and furthermore the base 11 of the crane is about midway between the two opposite short sides of the chassis, which enables the crane to serve both the infeed conveyor 6 and the discharge conveyor 7.

Figure 2:
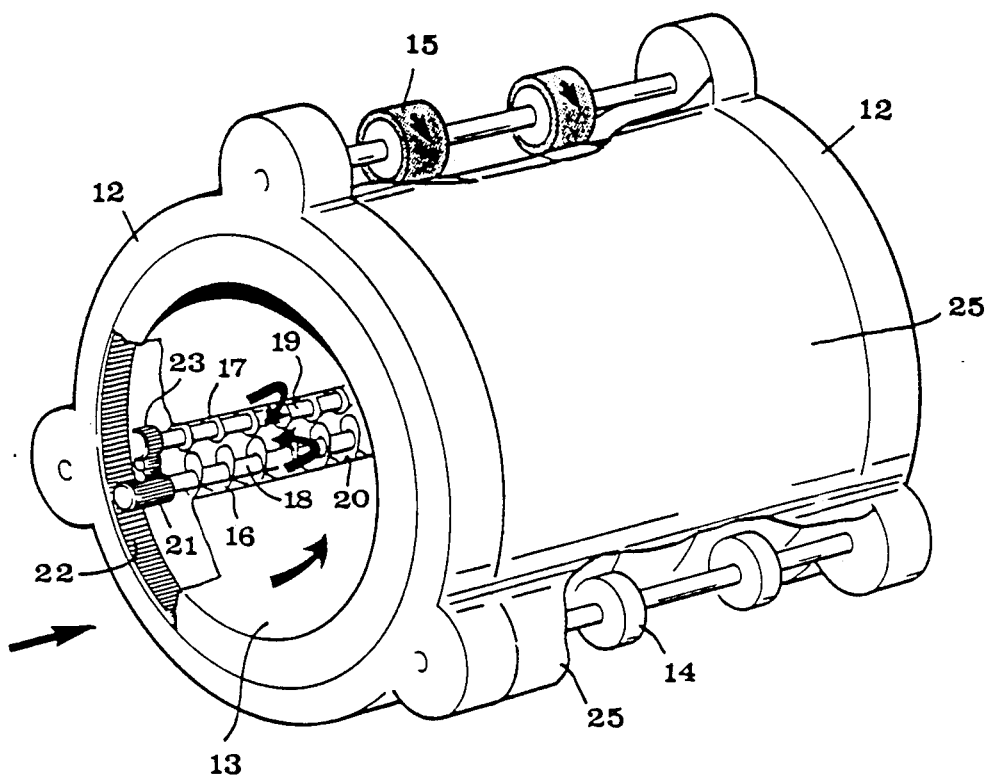
Figure 3:
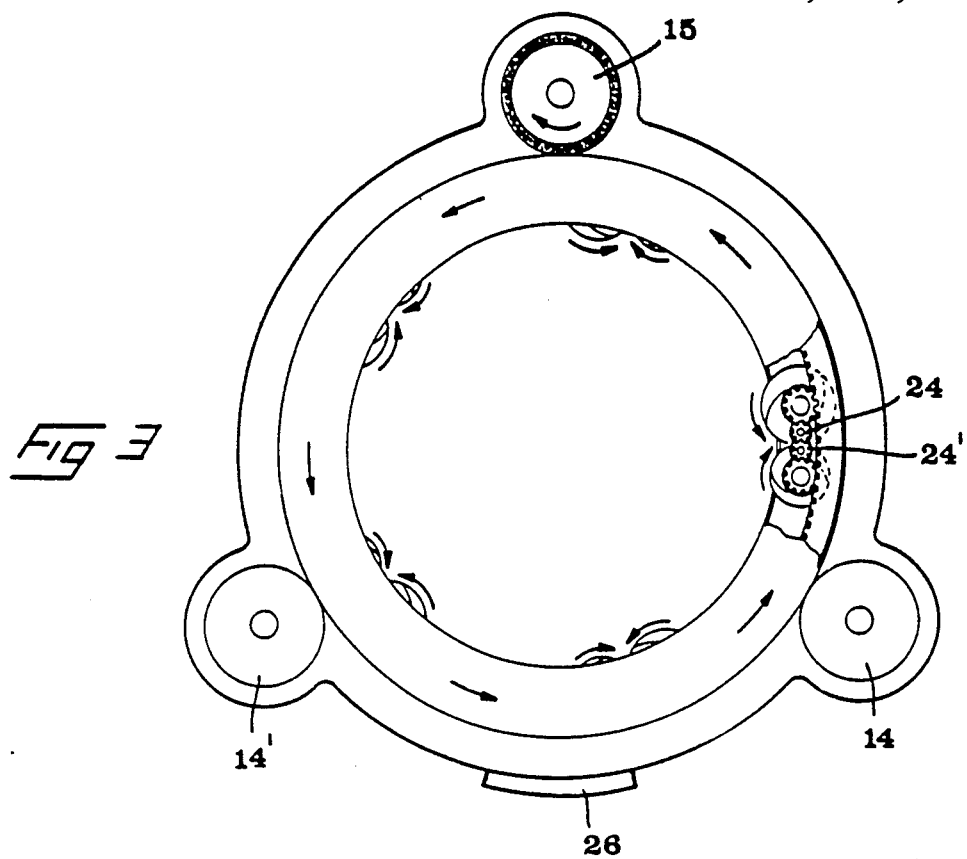

Reference is now made to FIGS. 2 and 3 which illustrate more closely the construction of the drum 2. FIG. 2 shows a drum section which, besides two annular end portions 12, 12' forming a stand or stator, comprises a substantially cylindrical drum portion 13 which is rotatably mounted relative to these stator rings. This drum portion is mounted on a suitable number of lower support wheels 14, 14' (see also FIG. 3) and can be set in rotation by means of an optional drive which here is illustrated by drive wheels 15 abutting and frictionally engaging the outer side of the drum.

According to the principle of the invention, a number of screws 16, 17 are mounted in pairs on the inner side of the drum 13 and are rotatable relative to the drum proper, said screws forming the processing devices for limbing the stem portions. More precisely, five pairs (A, B, C, D and E) of such processing screws are mounted in the drum. In the embodiment shown in FIGS. 2 and 3, the shaft or cores 18, 19 of the respective screws are arranged substantially in parallel with the axis or center of rotation of the drum proper 13, the shafts 18, 19 being disposed on the inner surface of the drum 13 in direct connection with a longitudinal opening 20 in the drum surface, such that merely the circumferential portions of the screws or screw-shaped ridges project beyond the drum wall.

A special and characteristic feature of the invention is that the screw 16 can be driven automatically by means of a transmission which is arranged between the rotatable drum and the stator ring 12 and which transforms the relative movement between the drum and the stator into a rotating movement of the screw. More precisely, this transmission consists of a gear wheel 21 connected to the screw shaft 18 and meshing with an annular gear rim 22 mounted on the fixed stator ring 12. When the drum 13 is rotated by means of the drive wheels, the screw shaft will thus be rotated via the gear wheel 21 at a rate which is considerably larger than that of the drum proper. Also the other screw shaft 19 comprises a gear wheel 23. To make the shaft 19 rotate in a direction opposite to that of the shaft 18, the gear wheel 23 is connected with the gear wheel 21 via two intermediate gear wheels 24, 24' of per se known type. It is to be noted that one screw, in this case the screw 17, is of a smaller diameter than the other one and is disposed behind the thicker one with respect to the feeding direction of the drum so as not to touch the stems proper, but just the twigs.

When the drum 13 is rotated, the two processing screws 16, 17 in each pair or set of screws will thus be rotated in opposite directions, while the twigs which occur on the longitudinally fed stem portions and which engage the screws, are pinched between the screws and cut or shorn off in the area between the circumferential portions of the screw ridges. Since the screws are rotated at a considerably higher speed than the drum proper, an extremely intense processing action of the screws is provided which efficiently cut off the twigs from the stems. Furthermore, the screws have not only a limbing effect on the stems but provide also the necessary longitudinal feeding of the stems through the drum owing to the inclination of the screw ridges relative to the axis of rotation of the drum.

In actual practice, the drum section shown in FIGS. 2 and 3 may have a length of about 2 m, three such sections being assembled to form a continuous drum 2 according to FIG. 1. Owing to the intense processing action of the screws, it is possible to drastically reduce the length of the drum and still obtain an improved limbing of the processed stems.

Concentrically outside the rotatable drum 13, there is preferably arranged a casing 25 which at the bottom has a discharge opening 26. In this casing, the shorn-off twigs are collected and may then be discharged through the bottom opening 26 and handled as desired, for example in that they are either collected and further processed, or directly brought back to the forest.

Figure 4:
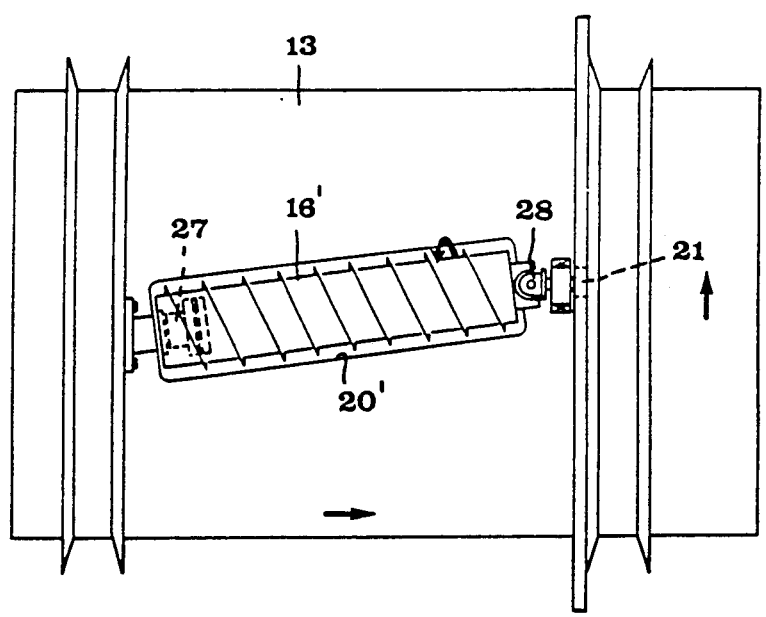

FIG. 4 illustrates an alternative embodiment in which but one screw 16' is associated with each opening 20' in the drum 13', said screw being inclined at a certain angle, in actual practice a small angle, for example 2°-20° or 5°-10°, relative to the axis of rotation of the drum. At its one end, the screw 16' is freely rotatably mounted on an inclined bearing bracket 27 and is connected, at its opposite end, to a pinion 21' via a universal joint 28 which allows the rotating movement of the pinion 21' to be transmitted to the inclined screw. Because of its inclination relative to the axis of rotation of the drum, the screw 16' promotes, to a larger extent than the above described screws, the feeding of the stems through the drum.

POSSIBLE MODIFICATIONS OF THE INVENTION

The invention is, of course, not restricted to the embodiment described above and shown in the drawings. Thus, it is possible to use, instead of screws, other types of rotatable processing tools or members.

For example, the processing members might consist of straight or otherwise nonhelical cutters mounted on a rotatable cylinder or core. The essential feature is that the processing members are rotatable in order to provide an extremely intense processing action as compared with the fixed cutters which have been used in prior art bundle limbers of relevant types.

Although the drum 2 in FIG. 1 has been shown fixedly mounted on the chassis 1, it may be preferable, in actual practice, to arrange the drum rotatable or pivotable in relation to the chassis, such that the drum can be turned relative thereto, which makes it possible to feed the unprocessed stems from one side of the road and discharge them on the other side without making it necessary to arrange the chassis transverse to the roadway.

I claim:

1. A bundle limber of the type comprising a rotatably mounted drum having infeed and discharge ends at opposite ends thereof, within which a number of processing devices are mounted for mechanically processing a bundle of stems or stem portions with twigs in order to limb and also feed said stems or stem portions longitudinally through the drum, said processing device comprising a rotary shaft which is rotatable about its longitudinal axis and relative to the drum; said rotary shaft including at least one tool adapted to remove, during the rotation of said rotary shaft relative to the drum, the twigs from the stem or stem portions, said rotary shaft being mounted with its longitudinal axis outside the wall of the drum and partially projecting through an opening in the drum wall such that a peripheral portion thereof is located immediately inside the drum wall.

2. A bundle limber as claimed in claim 1, further comprising a stationary stand which supports said drum, and transmission means disposed between the rotatable drum and the stationary stand which automatically drives said rotary shaft by transforming the relative movement between the drum and the stand into a rotary movement of said rotary shaft.

3. A bundle limber as claimed in claim 2 wherein said stand further comprises an annular gear rim mounted thereon, and wherein said transmission further comprises a gear wheel connected to the rotary shaft and which meshes with said annular gear rim.

4. A bundle limber as claimed in claim 1 wherein said tool comprises a screw.

5. A bundle limber as claimed in claim 4 wherein said rotary shaft is substantially parallel to the axis of rotation of the drum.

6. A bundle limber as claimed in claim 1 wherein said tool comprises at least one pair of cooperating processing screws adapted to rotate in opposite directions.

7. A bundle limber as claimed in claim 6 wherein one of said screws has a larger diameter than the other of said screws.

8. A bundle limber as claimed in claim 3 wherein said limber further comprises a pinion for driving said shaft and a universal joint connecting said shaft to said pinion such that said shaft is inclined at a small angle of between 2° and 20° relative to the axis of rotation of the drum.

9. A bundle limber as claimed in claim 1 further comprising a chassis upon which said drum is pivotally mounted, and a crane which is also supported by the chassis adjacent to the drum and positioned about midway between the infeed and discharge ends of the drum.

10. A bundle limber as claimed in claim 9 further comprising collapsible conveyors arranged at the two opposite ends of the drum which are adapted to feed unprocessed stems into the drum and discharge the processed stems.

* * * * *